March 4, 1930.                C. MORTENSEN                1,749,257
                           PASTEURIZING APPARATUS
                            Filed Jan. 26, 1927          4 Sheets-Sheet 1

Fig. 1.

INVENTOR
C. Mortensen,

March 4, 1930. C. MORTENSEN 1,749,257
PASTEURIZING APPARATUS
Filed Jan. 26, 1927 4 Sheets-Sheet 3

Inventor
C. Mortensen,
By
Attorney

March 4, 1930. C. MORTENSEN 1,749,257
PASTEURIZING APPARATUS
Filed Jan. 26, 1927 4 Sheets-Sheet 4
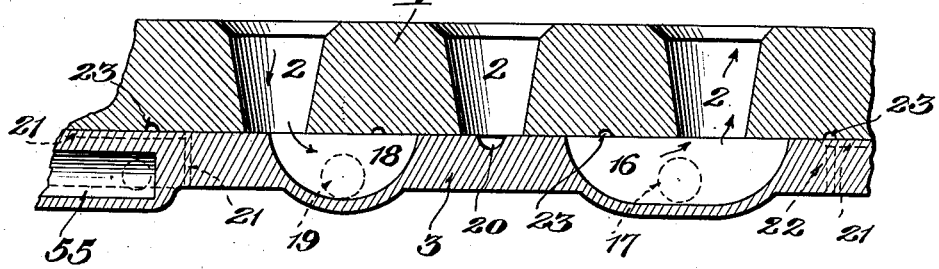
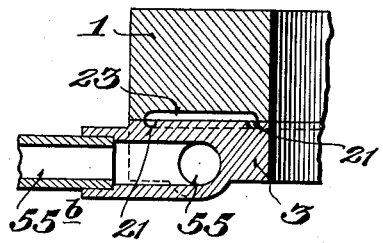 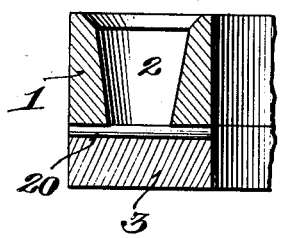
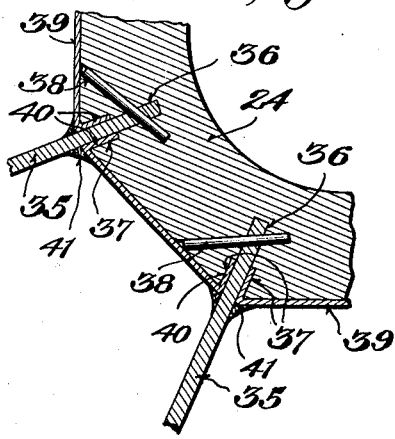 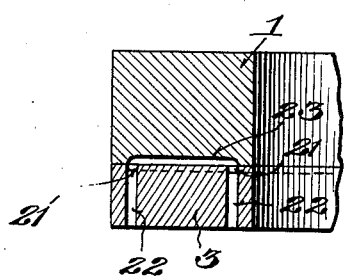
Inventor
C. Mortensen
By
Attorney
Witnesses:

Patented Mar. 4, 1930

1,749,257

UNITED STATES PATENT OFFICE

CORNELIUS MORTENSEN, OF LOUISVILLE, KENTUCKY

PASTEURIZING APPARATUS

Application filed January 26, 1927. Serial No. 163,798.

This invention relates to an improved apparatus for pasteurizing milk and other liquids, and more particularly to a device of the holder type in which the liquid is held in a series of interior compartments or chambers for a definite length of time at pasteurizing temperature to insure thorough and adequate destruction of bacteria.

In an apparatus of this type one of the essential considerations is to prevent milk in the process of pasteurization from passing from one compartment to another during the holding cycle so that no portion of the milk will be contaminated by milk which has not been held for a sufficient length of time to be properly pasteurized. Also, it is necessary that none of the milk in the various holders be released until the full pasteurizing period has expired. Heretofore these objects have been attained through the use of an inlet or supply pipe common to all of the compartments which are successively brought beneath the same, together with a separate valved outlet for each compartment, the said outlet valve successively stopping at a discharging station so that the pasteurized milk passes into a receiver and thence to the cooler.

Constructions of the type above referred to, although efficient and positive in operation, have certain disadvantages which it is the object of the present invention to overcome. That is to say, where the milk is discharged into the compartments from an inlet disposed above the same, foaming of the milk results and also when the milk is discharged into the receiver after being pasteurized additional foaming is produced, although in my former Patent No. 1,583,851, dated May 11, 1926, I provided means for preventing foaming in the receiver. Also, for sanitary reasons it is essential to sterilize an apparatus of this character after each period of use, and where a multiplicity of parts such as valves of various types are used in effecting the discharge of the milk, it is more or less difficult to properly and thoroughly cleanse the various parts. Furthermore, prior constructions have involved the use of a multiplicity of parts which not only adds to the cost of manufacturing but also increases the labor and cost of maintenance.

Accordingly, it is a primary object of the present invention to provide a construction wherein all foaming of the milk is absolutely eliminated and which has a minimum number of parts. Consequently, the apparatus is capable of being thoroughly cleansed or sterilized with facility, and may also be economically manufactured.

In addition to the foregoing, a special object is to provide novel means for controlling the supply and discharge of liquid to the holding compartments wherein the bottom of the container itself is provided with openings which cooperate with a bottom closure device for said openings, the said bottom closure device having feeding and discharge ports or passages for successively communicating with the openings. More specifically, the invention contemplates a novel valve device, a part of which is carried by the container and rotates therewith while the other part is yieldingly and adjustably mounted but maintained in a non-rotating position with reference to the part carried by the container so that relative movement therebetween controls the filling, holding, and discharge of the milk with only a minimum number of parts.

Another object of the invention is to provide novel and reliable means for preventing any leakage of the milk or other liquid which has not been held the required period from reaching the outlet to the cooler, or from reaching adjacent compartments.

A further object of the invention is to provide a novel compartment construction which materially simplifies the assembly of the machine and at the same time provides for the making of tight and sanitary joints which may be readily cleansed.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Fig. 1 is a vertical sectional view taken on the line 1—1 of Fig. 2 showing an apparatus embodying the present invention.

Fig. 5 is a detail sectional view taken on the line 5—5 of Fig. 3.

Fig. 6 is a detail cross sectional view taken on the line 6—6 of Fig. 3.

Fig. 7 is a detail vertical sectional view taken on the line 7—7 of Fig. 3.

Fig. 8 is a detail horizontal view taken through the center member of the container illustrating the manner of holding the partition members in place.

Fig. 9 is a detail vertical sectional view taken on the line 9—9 of Fig. 3.

Similar reference characters designate corresponding parts throughout the several figures of the drawings.

Figure 2:
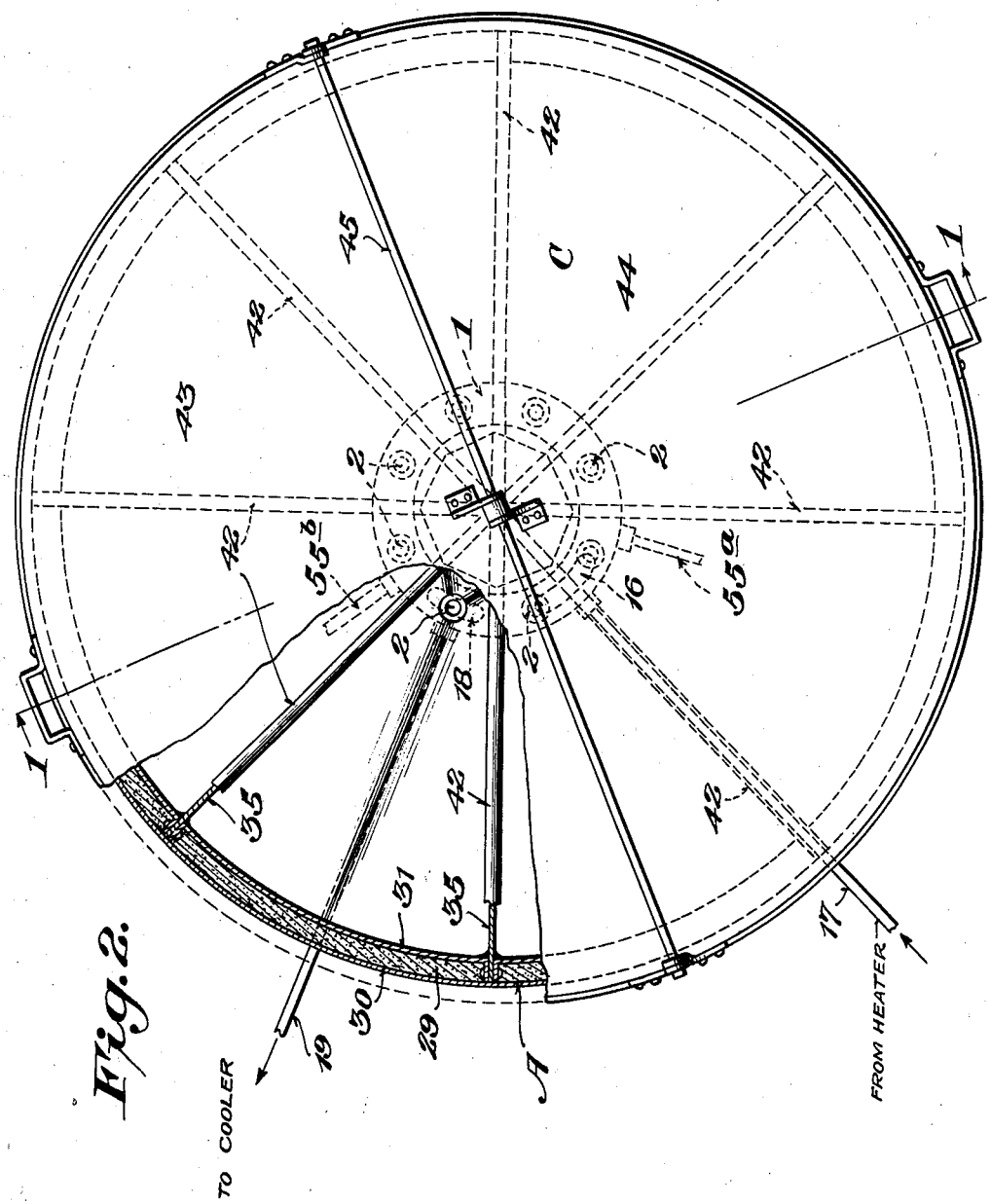
Fig. 2 is a top plan view of the apparatus shown in Fig. 1, the same being partly in section.
Figure 3:
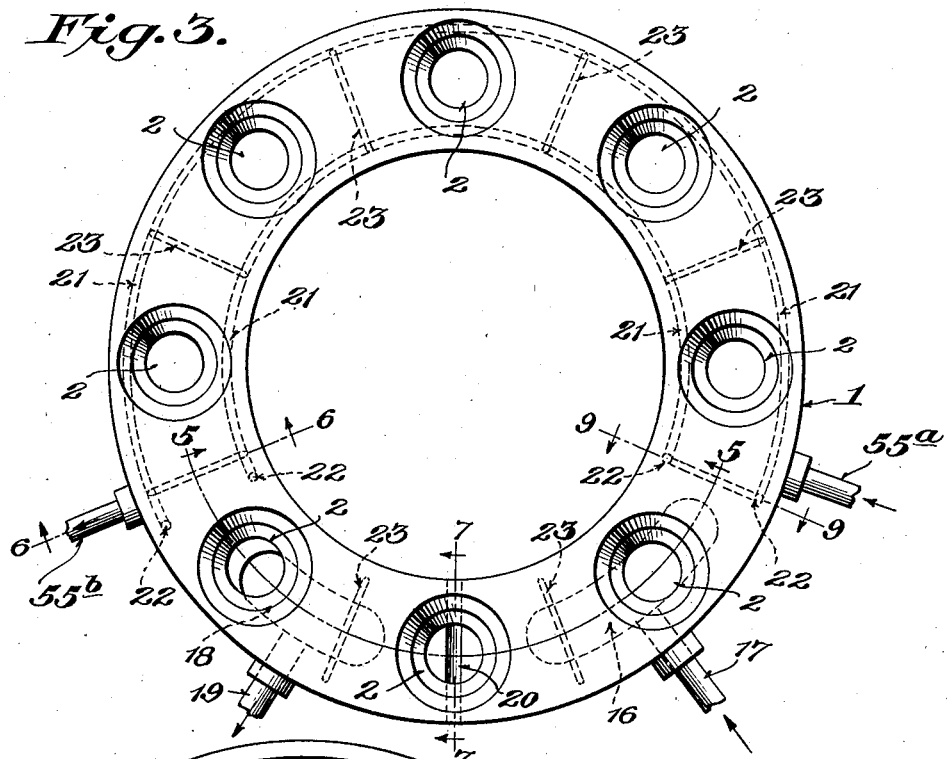
Fig. 3 is a detail plan view of the valve device carried by the bottom of the container.
Figure 4:
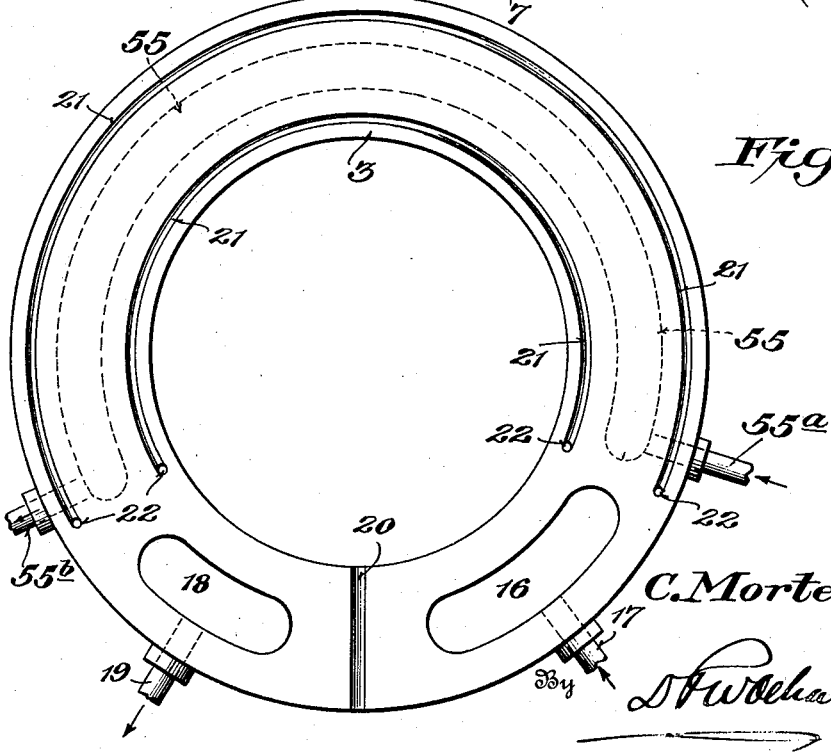
Fig. 4 is a top plan view of the base member of the valve device.

In carrying the present invention into effect, it is proposed, with a view to simplifying the general construction to provide a rotary holder or container having a plurality of non-communicating compartments with a separate bottom opening for each compartment together with a single cooperating non-rotating valve member having inlet and discharge ports adapted to successively communicate with the openings to the compartments to fill and empty the same as the holder makes its cycle. Therefore, the only rotating element of the present construction is the container itself while the single member at the bottom thereof forms a closure for the openings in the receptacle and permits of the filling and emptying of the compartments from a central point. Accordingly, the present invention includes in its organization an enclosed holder or container designated generally as A and having a plurality of radially arranged holding compartments B, the same being closed by a cover designated generally as C and adapted to rotate with the container. The said container A is rotatably supported upon a stand designated generally as S, and which will hereinafter be referred to more fully in detail, while the filling and emptying of the compartments is controlled by the novel valve device designated generally as D and located relatively at the center of the bottom of the container so that the filling and emptying both take place from the bottom of the container, thereby eliminating any possibility of foaming during filling or emptying.

The container A is preferably of circular form and the bottom A' carries therewith the bottom head 1 of the valve device D which rotates with the container. This bottom head is preferably in the form of a ring having a plurality of openings 2, one opening being provided for each of the compartments B and serving as an inlet as well as an outlet for the milk respectively during the filling and discharging periods of the pasteurizing cycle. One end of the openings 2 is always open to the compartment while the other or lower end is normally closed by the bottom closure member or non-rotating valve base 3.

This valve base 3 is also preferably in the form of a ring and the contacting surfaces of the bottom head and valve base are machined to provide a tight joint therebetween. Said base 3 is preferably a casting which includes the hub 4 and radial arms 5, the said hub 4 being yieldingly and adjustably supported by the spring 6 mounted on a post 7 provided with threads as indicated at 8 to receive a compression wheel or adjusting member 9 for regulating the force of the spring 6 to cause the machined surfaces of the control head and valve base to effectually remain in contact, and to also permit of the dropping or lowering of the valve base when desired to clean the apparatus. The lower end of the post 7 is keyed in the block 11 at its lower end while its upper end fits into the hollow central portion of the bottom head retaining or locking member 12.

For the purpose of preventing the valve base 3 from rotating, the same is preferably anchored to the stand S in any suitably manner, as for example, by means of the hook and eye arrangement or lock 14—15. This type of lock will adequately prevent relative rotation of the valve base which is frictionally engaged with the control head but will permit the valve base 3 to engage the control head 1 with the full force of the spring 6 and also permit of sufficient movement of the valve base to enable it to accommodate or adjust itself under all conditions of use to the bottom head. In that connection it will be observed that the hub 4 does not have a tight fit on the post 7 throughout its length but is purposely provided with a fulcruming rib 4ª at its upper end and which will enable the entire casting to rock if and when necessary to enable the flat machined surface thereof to follow the machined face of the bottom head.

With further reference to the valve base 3 it will be observed that the same is provided with a filling port 16 which communicates with an opening 17 that receives suitable piping leading from the pasteurizer and is also provided with a discharge port 18 communicating with an opening 19 which is piped to the cooler. The filling port 16 is relatively longer than the discharge port 18 and can therefore fill a second compartment while the preceding one is still being filled, but in the case of the discharge port 18 it will be observed that the same is of such length that only one of the openings 2 at a time is in communication therewith to prevent any but fully pasteurized milk from one of the holders B being discharged into the cooler. The inlet or filling port 16 and the discharge port 18 are so spaced in the cycle of movement of the container that there is a dead interval between complete discharge and filling, and in order to positively insure against the carrying over of any milk from the container which has just drained to the filling recess, or on the other hand preventing any milk from the filling port to make its way back to the discharge port a transverse groove 20 is provided between the two recesses, the same serving as a safety trap through which any leakage will go to waste.

Another feature of special importance in connection with the valve base 3 and control head 2 resides in the provision of means for preventing any milk whatever from reaching the milk in an adjacent holder, and to that end the valve base 3 is provided adjacent its inner and outer edges with the spaced arcuate grooves 21 which communicate with waste outlets 22 at each end thereof, and the said grooves 21 in turn communicate with the transverse grooves 23 formed on the underside or machined surface of the bottom head 1 between each of the openings 2 thereof. Clearly, with this arrangement any milk which might make its way from one of the passages 2 would be trapped by the transverse grooves 23 and shunted into the arcuate grooves 21 and proceed to waste. In that connection however, it may be pointed out that the matter of leakage between the members 1 and 3 is effectively safeguarded against by the close fitting machined surfaces of the two parts which may be made of nickel or equivalent metal which may be very highly machined and polished to provide accurate and effective cut-off means. The grooves 21 and 23 however, insure the safety of the milk and safeguard the contents of each compartment against contamination.

As the container A is rotated the bottom opening 2 will, at the start of the pasteurizing cycle, communicate with the filling or receiving port 16 and the milk from the pasteurizer will rise in the compartment as long as one of the passages 2 is in communication with the recess forming the port. As previously indicated the port is long enough to start the filling of a second compartment while the preceding one is still being filled in order to prevent back pressure in the filling line from the pasteurizer. However, in the case of the discharge port 18 it will be understood that only one bottom opening at a time communicates therewith. After a compartment of the container has been filled and has left the filling station it is carried around in the pasteurizing cycle so that the milk in the particular filled compartment is held at the pasteurizing temperature of approximately 145° Fahrenheit for thirty minutes. After being held for this period the compartment communicates with the discharge port 18 so that the milk may then pass to the cooler through the piping connections provided.

In connection with the bottom head 1 it will be observed that the same is provided with the outside flange 1$^a$ and the inside flange 1$^b$, the latter being engaged by the holding member 12 which is preferably of circular formation and provided with the central tubular neck portion 12$^a$ which is externally threaded and adapted to fit into a threaded opening provided in the bottom of the hollow center column 24 of the container. Suitable insulation is of course provided between the member 12 and the bottom of the center column as indicated at 25, the said insulation corresponding to the insulation used in constructing the base A'. The outside flange 1$^a$ of the control head receives therebeneath the end 26 of the bottom sheet 27 of the container so as to provide a tight joint between the control head and the bottom of the container which will prevent the collection of foreign matter and maintain proper sanitary conditions.

Referring more particularly to the detail construction of the holder or container A it will be observed that the bottom A' thereof includes the insulation sections 28 while the outside thereof is provided with an interior insulation wall 29 whose outer face is covered by a porcelain or other facing 30 while the inside thereof is covered by the metallic facing sheet 31. The upper edge of this facing sheet cooperates with the shouldered top ring 32 to provide a tight inside joint and the said top ring 32 covers the upper end of the insulation wall 29 and is also turned downwardly as indicated at 33 over the upper edge of the porcelain facing 30. The bottom of each compartment is formed by a copper or other metallic member 34 which is inclined toward the opening 2, and the side walls of each compartment are formed by a partition member 35 whose inner edge is interlocked with the center column 24 in a novel manner as will be observed from Fig. 8. Referring to this figure it will be observed that the corners of the center column 24 are provided with a recess which is relatively narrow at its inner end as indicated at 36 and wider at its open end as indicated at 37. The narrow end 36 receives the partition 35 and the latter is locked in the base by means of the screw 38 or its equivalent. The facing sheets 39 which form the rear walls of the compartments B are provided with the inturned flanges 40 which fit into the wide part 37 of the recess and thus become securely locked in place because of the relatively dove-tailed formation provided by this construction. The groove formed by the junction of the partition 35 with the sheet 39 is filled with solder as indicated at 41 for security and sanitation. The tops of the partitions 35 are provided with an upstanding rib 42 which causes the partitions to be higher than the upper surfaces of the top ring 32 so that there is no possibility of milk from one compartment flowing into an adjacent one if it should be overfilled. This feature however, is covered in my former patent aforesaid.

The top of the container is closed by the cover C which comprises two sections 43 and 44 diametrically hinged together as at 45. This cover rotates with the container A and requires no part thereof to be stationary because the milk is fed into the containers from the bottom.

As previously indicated, the entire container A is supported on the stand S, and this stand includes in its organization the leg members 46 which are tied together at their lower ends by the wrought iron strap 47 which not only connects the legs but also the block 11 to avoid spreading and to generally stabilize the construction. The strap 47 is made of wrought iron so that in event the machine rests on an uneven floor the wrought iron will readily adjust itself whereas a cast member would crack. The upper ends of the legs 46 support a bearing ring 48 whose upper side is formed with a groove to constitute one part of a ball-race for receiving the ball-bearings 49, the other half of the ball-race being provided by the ring 50 which extends entirely around the bottom of the container to provide a continuous upper raceway for the bearings 49 and also support and distribute the weight of the container properly over the stand. The said ring 50 has the laterally extending arms or spider portions 51 to further assist in supporting the container, and the rack 52 is also preferably carried by the ring 50.

The said rack 52 is propelled by the motor 53 supported on one or more of the legs 46, although any other convenient support may be utilized if desired. The manner of driving the container is well known in the art and further description in that connection is believed unnecessary. It might be stated however, that the timing of the cycle is such that the holding period of thirty minutes is positively assured, that is, the time elapsing between the cut-off at the inlet port and the instant that the same compartment reaches the discharge port is thirty minutes and the time for filling and discharging will be regulated by the pumps in the intake and discharge line as will be readily apparent.

Another feature of practical importance in connection with the valve base 3 is the provision of means for keeping the same at the proper temperature so that no portion of the milk in the openings 2 will be underheated. As will be observed from the drawings, the portion of the valve base extending beneath the openings of the containers which hold milk is provided with heating means such for example as a jacket or passage 55 for receiving hot water or waste steam vapor, the greater portion of whose heat has been spent in other apparatus. The said jacket 55 is of course, provided with inlet and outlet connections 55$^a$ and 55$^b$ respectively for maintaining circulation in the jacket, and with this arrangement it will be apparent that the valve base and associated parts may be maintained at a proper degree of temperature to insure thorough and adequate pasteurization of all the milk.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a pasteurizing apparatus, the combination with a rotary holder having compartments contained within a common insulating wall, of non-foam producing valve means arranged at the bottom of said holder for controlling the filling, holding and discharging of the contents of said compartments, said means comprising a two-part valve device including superposed ring members each having flat engaging faces located at the bottom face of the holder, one of said rings being carried with the bottom of the container and having a plurality of openings and the other of said parts held in a non-rotating position and having inlet and discharging means.

2. A pasteurizing apparatus including a rotary holder having a plurality of separate non-communicating holding compartments, and non-foaming flush valve means for filling and emptying said compartments successively from the bottom of the container while rotating, said flush valve means comprising a ring member carried by the container, and provided with an opening having a vertical axis for each compartment, and a second non-rotating ring having an inlet port and a separate discharge port adapted to successively register with the passages in the first named member as the same rotates, and means for preventing communication between said openings and ports.

3. A pasteurizing apparatus including a rotary holder having a plurality of separate non-communicating holding compartments, and non-foam producing flush valve means for filling and emptying said compartments successively from the bottom of the container while rotating, said means comprising a two-part valve including a control head provided with separate openings each having a vertical axis and communicating with each of said compartments, and a valve base having spaced inlet and discharge ports in one face thereof and an intervening flat face for covering the passages of the compartments which are holding liquid, and means between the cooperating engaging faces of the valve device for preventing communication between said passages in the control head and also preventing communication between the inlet and discharge recesses.

4. A pasteurizing apparatus including a rotary holder having a plurality of separate non-communicating holding compartments, and non-foam producing flush valve means for filling and emptying said compartments successively from the bottom of the container while rotating, said means comprising a valve device including a pair of concentric ring-like members one of which is carried by the container and provided with an opening having a vertical axis for each compartment serving both as a filling and outlet passage, and the other of said members having spaced inlet and discharge ports and being held in a non-rotating position and engaging with the other member in a plane at right angles to the vertical axis of said opening, the adjacent faces of said member being provided with means for preventing communication between the passages and also preventing communication between the inlet and discharge orifices.

5. A pasteurizing apparatus including a rotary container having a plurality of holding compartments, a non-foam producing two part valve device for controlling the filling and discharging of said compartments, said valve device comprising a ring-like member having openings each having a vertical axis and communicating with the compartments and a horizontal cut-off face, and an adjustable valve base having inlet and discharge means held against the flat face of the ring-like member, and means on the cooperating faces of the control head and valve base for preventing leakage of milk from one compartment to another and also preventing leakage between the filling and discharge means.

6. A pasteurizing apparatus including a container having a plurality of holding compartments therein, a non-foam producing two part valve device arranged at the bottom of the container, one part of said valve device being carried with the container and having passages formed on vertical axes and opening at a flat face thereof, and the other part of the valve device being non-rotating and provided with spaced inlet and outlet ports, and means at the contacting faces of said valve base and control head for preventing leakage of liquid from one passage to the other and between the inlet and outlet ports.

7. A pasteurizing apparatus including a continuously rotating holder adapted to hold the liquid to be pasteurized at the required temperature and for the required time, said holder having a plurality of holding compartments each provided with a bottom opening having a vertical axis and serving alternately as an inlet and outlet passage, and a member having a face at right angles to the vertical axis of the opening and forming the bottom closure for all of said compartments and having feeding and discharging ports adapted to successively communicate with said bottom openings.

8. A pasteurizing apparatus including a continuously rotating holder adapted to hold the liquid to be pasteurized at the required temperature and for the required time, said holder having a plurality of holding compartments each provided with a bottom opening having a vertical axis and serving alternately as an inlet and outlet passage, and a fixed member forming the bottom closure for all of said receptacles and having a flat surface at right angles to the vertical axis of said opening provided with inlet and discharge ports adapted to successively communicate with said bottom openings to provide for introducing the liquid upwardly into the compartments and effecting its discharge, without foaming.

9. A pasteurizing apparatus including a continuously rotating holder having a plurality of separate non-communicating compartments each provided with a bottom opening having a vertical axis, a non-rotating valve base forming the bottom closure for all of said compartments and having inlet and discharge ports adapted successively to communicate with said openings to provide for introducing the liquid upwardly into the compartments and effecting its discharge without forming, and inlet and discharge pipe connections for the valve base.

10. A pasteurizing apparatus including a continuously rotating holder having a plurality of separate non-communicating holding compartments each having a bottom opening alternately serving as an inlet and an outlet and opening in a horizontal plane, a non-rotating valve member having a flat face for engaging with the bottom of the holder and constituting a closure for said openings therein, said valve member also having feeding and discharge ports, pipe connections for directly conveying the liquid to be pasteurized to said non-rotating valve member whereby it passes through the feeding port and into the holding compartment in an upward direction to avoid foaming.

11. A pasteurizing apparatus including a rotary holder provided with a plurality of compartments each having a bottom opening having a vertical axis, and a non-rotating flush valve member having a face flushly fitting against the bottom openings of all of the compartments and forming the closure therefor.

12. A pasteurizing apparatus including a rotary holder provided with a plurality of compartments each having a bottom opening having a vertical axis, and a non-rotating flush valve member having a face lying at right angles to the vertical axis of the said opening and flushly fitting against the bottom openings of all of the compartments and forming the closure therefor, and means for adjusting said valve member toward and from the bottom of the holder.

13. A pasteurizing apparatus comprising in combination, a stationary valve member having a flat, horizontally disposed upper face, a rotary holder inclusive of a plurality of separate compartments each having a portion of the bottom wall thereof overlying said valve member and seating against the flat upper face thereof, and means for filling one of said compartments and simultaneously emptying another through said valve member during rotation of said holder.

14. A pasteurizing apparatus comprising in combination, a rotary holder inclusive of a plurality of separate compartments, each having an opening formed through the bottom wall thereof, a stationary valve member having a flat horizontally disposed upper face seating against an under face of said holder and provided with inlet and outlet passages opening upwardly through said flat upper face with which the opening in the bottom of each compartment is adapted successively to aline during rotation of the holder.

In testimony whereof I hereunto affix my signature.

CORNELIUS MORTENSEN.